(12) United States Patent
Wesslén et al.

(10) Patent No.: US 7,707,592 B2
(45) Date of Patent: *Apr. 27, 2010

(54) MOBILE TERMINAL APPLICATION SUBSYSTEM AND ACCESS SUBSYSTEM ARCHITECTURE METHOD AND SYSTEM

(75) Inventors: Anders Wesslén, Staffanstorp (SE); William J. Croughwell, Durham, NC (US); Sebastian Weber, Malmo (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1610 days.

This patent is subject to a terminal disclaimer.

(21) Appl. No.: 10/857,522

(22) Filed: May 27, 2004

(65) Prior Publication Data

US 2005/0088983 A1 Apr. 28, 2005

Related U.S. Application Data

(60) Provisional application No. 60/510,578, filed on Oct. 10, 2003, provisional application No. 60/510,558, filed on Oct. 10, 2003.

(51) Int. Cl.
G06F 9/44 (2006.01)
H04M 11/00 (2006.01)

(52) U.S. Cl. .................................... 719/328; 455/403
(58) Field of Classification Search ................ 719/310, 719/328, 311; 455/403, 550.1, 3.01; 370/395.62, 370/518

See application file for complete search history.

(56) References Cited

U.S. PATENT DOCUMENTS

| | | | | |
|---|---|---|---|---|
| 6,192,250 B1 * | 2/2001 | Buskens et al. | ............. | 455/463 |
| 6,721,779 B1 * | 4/2004 | Maffeis | .................... | 709/202 |
| 6,992,991 B2 * | 1/2006 | Duske et al. | ................. | 370/316 |
| 7,286,823 B2 * | 10/2007 | Reinholdsson et al. | ...... | 455/419 |
| 7,295,608 B2 * | 11/2007 | Reynolds et al. | ........ | 375/240.01 |
| 2003/0143973 A1 | 7/2003 | Nagy et al. | | |
| 2003/0236089 A1 * | 12/2003 | Beyme et al. | ............... | 455/423 |
| 2004/0097226 A1 * | 5/2004 | Hull et al. | ................. | 455/426.1 |
| 2004/0216147 A1 * | 10/2004 | Yanosy et al. | ............... | 719/328 |
| 2005/0004968 A1 * | 1/2005 | Mononen et al. | ............ | 709/200 |
| 2005/0037708 A1 * | 2/2005 | Torvinen | ................... | 455/41.2 |
| 2006/0133307 A1 * | 6/2006 | Fukasawa et al. | ........... | 370/328 |

FOREIGN PATENT DOCUMENTS

EP 1 380 960 1/2004
WO WO 2004/008328 1/2004

OTHER PUBLICATIONS

"The Intel® Personal Internet Client Architecture"; Intel; Sep. 2001; pp. 1-16.

(Continued)

*Primary Examiner*—Van H Nguyen
(74) *Attorney, Agent, or Firm*—Michael G. Cameron (57) ABSTRACT

A mobile-terminal platform system having an application subsystem and an access subsystem. The access subsystem includes hardware and software for providing connectivity services. The application subsystem includes hardware and software for providing user application services. The application subsystem and the access subsystem communicate via a defined interface. Each of the application subsystem and the access subsystem are adapted to be independently scaled.

10 Claims, 5 Drawing Sheets

OTHER PUBLICATIONS

Integrated Device Technology, Inc., Dec. 2002, High-Speed 2.5V 8/4K X 18 Dual-Port 8/4K X 16 Dual-Port Static RAM; pp. 1-21.
U.S. Appl. No. 10/857,522, Anders Wesslén et al.
U.S. Appl. No. 10/359,835, Torbjorn Solve et al.
U.S. Appl. No. 10/857,319, filed May 27, 2004, Fredrik Angsmark et al.
U.S. Appl. No. 10/857,320, filed May 27, 2004, Kumar Balachandran et al.

* cited by examiner

MOBILE TERMINAL APPLICATION SUBSYSTEM AND ACCESS SUBSYSTEM ARCHITECTURE METHOD AND SYSTEM

CROSS-REFERENCE TO RELATED APPLICATIONS

This patent application claims priority from and incorporates by reference the entire disclosures of: 1) U.S. Provisional Patent Application No. 60/510,578, filed on Oct. 10, 2003, and 2) U.S. Provisional Patent Application No. 60/510,558, filed on Oct. 10, 2003. This patent application incorporates by reference the entire disclosure of U.S. Pat. No. 7,536,181, granted on May 19, 2009. This patent application incorporates by reference the entire disclosure of a U.S. patent application Ser. No. 10/857,320.

BACKGROUND OF THE INVENTION

1. Technical Field

The present invention generally relates to mobile-terminal platform systems, and more particularly, but not by way of limitation, to mobile-terminal platform systems that are readily scalable with respect to both access services and application services.

2. History of Related Art

Since cellular telecommunications systems were first introduced in the 1980's, mobile terminals utilized in the cellular telecommunications systems have become increasingly complex. Mobile terminals were initially designed to primarily provide voice telephony services. In later years, mobile terminals were developed that also included the ability to transfer user data not related to that of a voice telephone call. Such user data included, for example, data to be transferred over a dial-up network connection initiated via a personal computer.

Currently, so-called third generation (3G) systems are being developed. 3G systems combine high-speed access with traditional voice communications and provide a user with access to internet browsing, streaming audio/video, positioning, video conferencing, as well as many other capabilities other than traditional voice telephony.

The Third Generation Partnership Project (3GPP) was established in an effort to ensure compatibility among several 3G systems being developed around the world. The Universal Mobile Telephone System (UMTS) is being developed by 3GPP to provide a 3G system that includes terrestrial and satellite systems capable of delivering voice, data, and multimedia anywhere in the world.

The drastically-increased functionality that is being included in cellular telecommunications systems via the 3GPP standardization has placed substantial demands on mobile-terminal developers to be used in the cellular telecommunications systems. This demand is exacerbated by the fact that a mobile terminal is a so-called resource-scarce environment that is limited in size, memory, and power. Mobile-terminal developers have traditionally designed, fabricated, and marketed substantially-complete mobile terminals that include all of the hardware and software needed for basic terminal operation, as well as the hardware and software needed to provide the features and capabilities desired by the developer or a particular user based upon their perception of market needs. As market demand has increased for mobile terminals with additional capabilities not traditionally found in mobile terminals, such as, for example, multimedia, including cameraphone features, mp3 players, videophony features, short range wireless communication features, such as, for example, BLUETOOTH, and Universal Serial Bus (USB) connectivity, the traditional mobile-terminal design, fabrication, and marketing approaches have not been able to provide the flexibility to quickly adapt to rapid changes in market demands or satisfy the diverse requirements of multiple users.

There is, accordingly, a need for a method of and system for a scalable mobile-terminal platform that addresses the demands discussed above.

SUMMARY OF THE INVENTION

A mobile-terminal platform system includes an application subsystem and an access subsystem. The access subsystem includes hardware and software for providing connectivity services. The application subsystem includes hardware and software for providing user-application services. The application subsystem and the access subsystem communicate via a defined interface. Each of the application subsystem and the access subsystem may be independently scaled.

A method of creating a mobile-terminal platform system includes providing an application subsystem and providing an access subsystem. The application subsystem includes hardware and software for providing user-application services. The access subsystem includes hardware and software for providing connectivity services. The application subsystem and the access subsystem are inter-operably connected via a defined interface. At least one of the application subsystem and the access subsystem may be independently scaled. Access to the access subsystem and the application subsystem is permitted only via a middleware of the application subsystem.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Embodiment(s) of the present invention will now be described more fully with reference to the accompanying Drawings. The invention may, however, be embodied in many different forms and should not be construed as limited to the embodiments set forth herein. The invention should only be considered limited by the claims as they now exist and the equivalents thereof.

Figure 1:
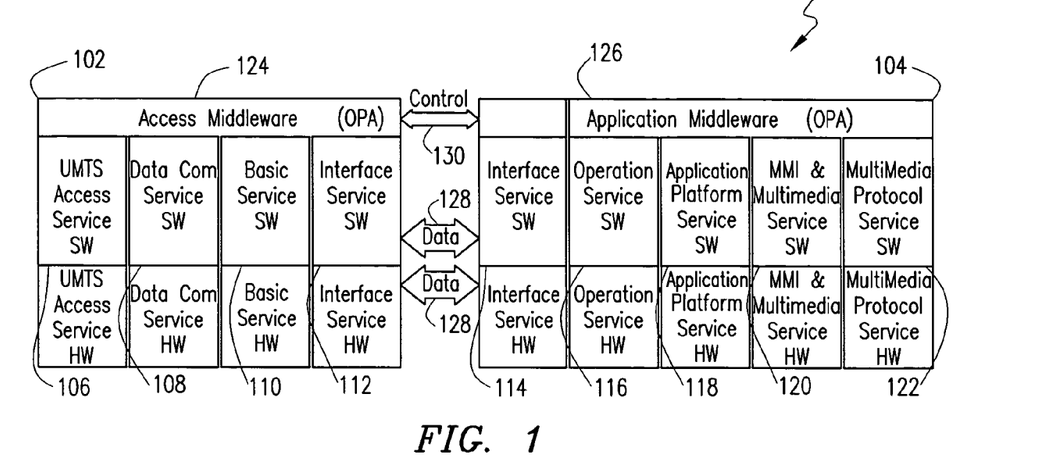
FIG. 1 is a logical-view block diagram of a mobile-terminal platform system.

FIG. 1 is a logical-view block diagram of a mobile-terminal platform system 100. The mobile-terminal platform system 100 may be optimized for low total cost and adapted for scalability in cost and functionality. The mobile-terminal platform system 100 is adapted to permit reuse of previously-made software investments. The mobile-terminal platform system 100 may be adapted to support a wide product range from, for example, automotive applications to so-called smart phones.

The architecture of the mobile-terminal platform system 100 includes a functional split between an access subsystem 102 and an application subsystem 104. The functional split may be viewed as a separation between standardized communication protocols handled by the access subsystem 102 and end-user functionality handled by the application subsystem 104. The functional split may also be viewed as a separation between real-time control handled by the access subsystem 102 and high-performance execution handled by the application subsystem 104. High-performance execution refers to so-called best-effort execution, while real-time control refers to control in which meeting deadlines in a timely fashion is important. The functional split permits a more predictable performance estimate on the application subsystem 104 relative to platform systems that do not employ a functional split. The functional split may be used to permit the application subsystem 104 and the access subsystem 102 to be independently optimized and integrated for different responsibilities handled by the access subsystem 102 and the application subsystem 104, respectively.

The functional split may be used to permit the access subsystem 102 to handle critical functionality for type approval of the mobile-terminal platform system 100 and also to permit the access subsystem 102 to be utilized in a stand-alone mode as part of, for example, a telematics solution. The functional split may also permit use of various different operating systems on the access subsystem 102 and the application subsystem 104, such as, for example, OSE, SYMBIAN OS, or WINDOWS CE. However, the functional split need not be a mere adaptation towards an operating system in which the operating system only treats the access subsystem 102 as a modem, but can instead be, for example, a gateway as discussed in detail in U.S. patent application Ser. No. 10/857, 320. The functional split may also be adapted to permit the access subsystem 102 to serve as a trusted entity that checks code to be loaded on the application subsystem 104 before the code is run on the application subsystem 104. The application subsystem 104 may be either untrusted or not-completely trusted.

The mobile-terminal platform system 100 includes a plurality of service stacks 106-122, each of which includes integrated hardware and software components that provide various functionalities of the mobile-terminal platform system 100. The service stacks 106-122 include a plurality of service stacks 106-112, which are part of the access subsystem 102, and a plurality of service stacks 114-122, which are a part of the application subsystem 104. The service stacks 106-112 include communications stacks, a Universal Mobile Telecommunications Standard (UMTS) access service stack 106, a data communications (datacom) service stack 108, a basic service stack 110, and an interface (IF) service stack 112 being exemplary service stacks shown as part of the access subsystem 102. Each of the service stacks 106-112 includes integrated software and hardware, as shown in FIG. 1. The application subsystem 104 includes a plurality of application stacks, an IF service stack 114, an operation service stack 116, an application platform service stack 118, a man-machine interface and multimedia (MMI and MM) service stack 120, and a multimedia protocol service stack 122 being exemplary stacks shown as part of the application subsystem 104.

The IF service stack 114 corresponds to and communicates with the IF service stack 112. Data communications 128 and control 130 between the access subsystem 102 and the application subsystem 104 occur via the IF service stack 112 and the IF service stack 114. The control 130 is shown at a higher level on FIG. 1 relative to the data communications 128 in order to illustrate that the data communications 128 are a lower-level communication than the control 130. Each of the service stacks 114-122 includes integrated software and hardware, as shown in FIG. 1. The access subsystem 102 and the application subsystem 104 include an access middleware (OPA) 124 and an application middleware (OPA) 126, respectively. The access middleware (OPA) 124 has an application programming interface and a method of communicating with the application programming interface. In contrast, the application middleware 126 has an application execution environment and an application programming interface (OPA).

The access subsystem 102 is adapted to support connectivity, such as, for example, WCDMA (Wideband Code Division Access), EDGE (Enhanced GSM Data Evolution), GPRS (General Packet Radio Service), and BLUETOOTH, and may also include an IP-centric solution capable of routing data between different interfaces. The term EDGE, as used herein, means and refers to at least one of EGPRS (Enhanced General Packet Radio Service), and ECSD (Enhanced Circuit Switched Data). The UMTS access service stack 106 is adapted to handle standardized communications according to, for example, WCDMA, GSM, EDGE, and GPRS. The datacom service stack 108 handles data communications according to, for example, UART, USB, IrDA, UART, and BLUETOOTH.

In contrast to the access subsystem 102, the application subsystem 104 is adapted to support user applications, such as, for example, multimedia, MMI, and other user applications. User applications are applications that an end user of the mobile-terminal platform system 100 uses. The access subsystem 102 and the application subsystem 104 may, for example, be implemented on the same die or as separate application-specific integrated circuits (ASICs).

The basic service stack 110 is adapted to handle access-subsystem-specific support for an operating system used by the mobile-terminal platform system 100. The basic service stack 110 may, for example, include security functions, subscriber identity module (SIM) access, and system control. The IF service stacks 112 and 114 are together adapted to handle functionality required to interface between the access subsystem 102 and the application subsystem 104. Although shown as two separate stacks, the IF service stack 112 and the IF service stack 114 may be implemented on a single die. The IF service stacks 112 and 114 are both present regardless of whether implemented on a single die or not. The multimedia protocol service stack 122 addresses functionality above IP such as, for example, object exchange (OBEX) and BLUETOOTH application services.

The operation service stack 116 is adapted to handle system functions such as, for example, system control, system data handling, component management, proxy management, core application security, application cryptographic functions, smart card functions, and application terminal management. The application platform service stack 118 is adapted to handle services such as, for example, SMS/EMS services, cell broadcast service, phone book service, platform accessory services, clock service, and positioning application service.

The MMI and MM service stack 120 is adapted to handle services such as user interface (UI) services, audio services and control, voice control services, graphics (display) services, image services, camera services, and video services. The MMP service stack 122 is adapted to provide application protocol services, including, for example, multimedia protocols, WAP protocols, OBEX protocol, and BLUETOOTH application services. The MMP service stack 122 may provide protocols for both packet-switched and circuit-switched bearers.

The mobile-terminal platform system 100 may be adapted to offer and support a range of different application environments for development of applications on the application subsystem 104. Each application environment has its own characteristics. An application environment is characterized by: the way applications are developed (programming language support, compilation, and linkage); the type of binaries executed (e.g., ARM object files, JAVA class files); the functional services that are offered; and potential restrictions in use. Support for multiple application environment alternatives facilitates a wide range of products with varying demands such as, for example, cost, ease of use, time-to-market, functionality set, size, and portability. The functional split may also be adapted to permit the access subsystem 102 to be trusted and check code to be loaded on the application subsystem 104, which may either untrusted or not-completely trusted, before the code is run on application subsystem 104.

The mobile-terminal platform system 100 is scalable in the sense that it enables the configuration of services required for development of cost-centric and size-centric devices. Such a configuration may, for example only provide a native application environment for development of small, efficient, and static applications. In contrast, using a runtime execution environment for non-native applications supported by the mobile-terminal platform system 100 would allow for development of more advanced products with support for, for example, both native and downloadable applications. Services provided by the mobile-terminal platform system 100 are typically abstracted from internal platform structures and data types; therefore, applications are unaffected by internal changes to the mobile-terminal platform system 100, as long as the functionality of the mobile-terminal platform system 100 remains unchanged.

The mobile-terminal platform system 100 typically offers an application environment for native applications. A native application environment provides functional services directly through the application middleware (OPA) 126. The application middleware (OPA) 126 may thus include support for dynamic invocation of selected native platform services. The access middleware (OPA) 124 and the application middleware (OPA) 126 may be viewed as a split Open Platform API (OPA). This split between the access middleware (OPA) 124 and the application middleware (OPA) 126 is typically invisible to application developers. Services that are located on the access subsystem 102 are typically not directly reachable by application developers from the access middleware (OPA) 124 or the application middleware (OPA) 126.

Data communication functions are divided between the access subsystem 102 and the application subsystem 104. From an OSI reference model point of view, the physical, data link, network and transport layers are located on the access subsystem 102, while the session, presentation and application layers are located on the application subsystem 104.

Figure 2:
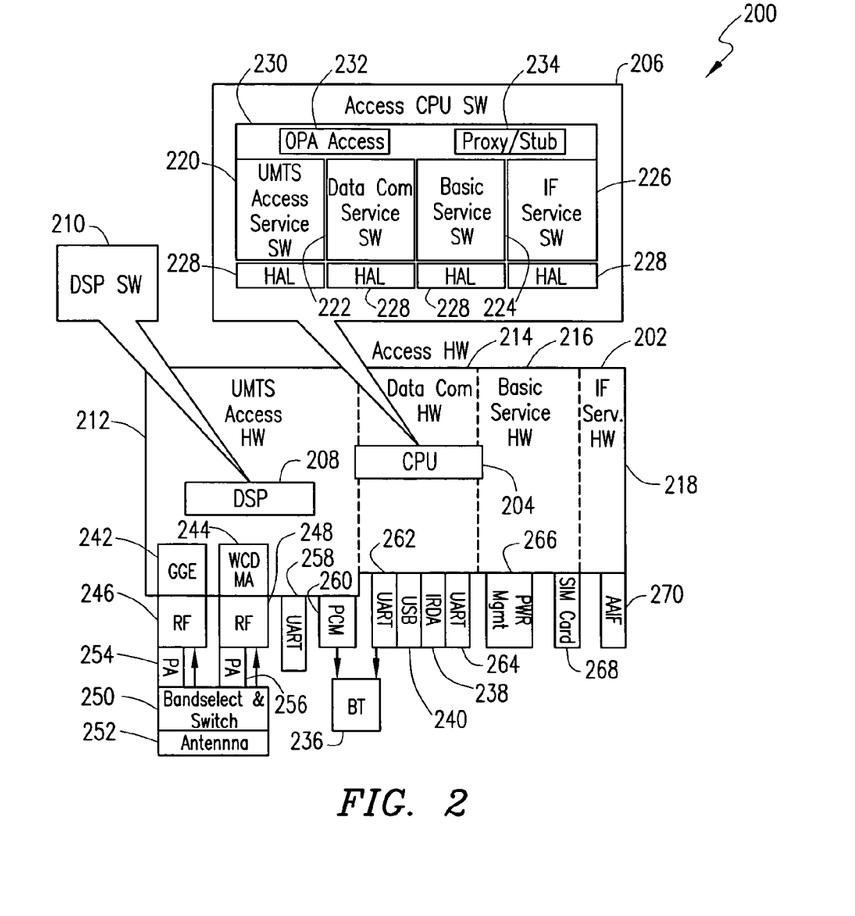
FIG. 2 is a functional block diagram of the access subsystem of the mobile-terminal platform system shown in FIG. 1.

FIG. 2 is a functional block diagram of an access subsystem 200. In the functional split discussed above, the access subsystem 200 is adapted to include access functions such as, for example, handling of network signaling, circuit-switched audio coder-decoder (codec) functionality, SIM/USIM card access, external interfaces (e.g., BLUETOOTH, RS232, IrDA, USB), positioning protocol support, positioning measurements for OTDOA, and support of external A-GPS solutions, access security, and cryptographic hardware. The access subsystem 200 typically also includes an accessory control bus and a data communications stack up to and including TCP/IP (not explicitly shown). A relatively-accurate clock is usually used by the access subsystem 200 due to air-interface requirements.

Data communication stacks and external interfaces are placed on the access subsystem 200 in order to achieve better real-time characteristics, tighter integration, and enhanced value to users. The access subsystem 200 is adapted to control external connections; therefore, services such as always-best/cheapest-connected can be implemented on the access subsystem 200. The access subsystem 200 may be scalable to support different network standards, such as, for example, WCDMA, GSM/GPRS, and EDGE.

The access subsystem includes access hardware 202, the access hardware 202 including a central processing unit (CPU) 204 and a digital signal processor (DSP) 208, overall functionality of the combination of the CPU 204 and the DSP 208 being logically illustrated by the access hardware 202, the access CPU software 206, and DSP software 210. The access CPU software 206 is loaded on the access CPU 204, while the DSP 208 has the DSP software 210 loaded thereon. Functionality performed by the access hardware 202 includes functions performed by UMTS access service hardware 212, datacom service hardware 214, basic service hardware 216, and IF service hardware 218.

The UMTS access service hardware 212 includes a GSM/GPRS/EDGE (GGE) block 242 and a WCDMA block 244, as well as the DSP 208. In the access subsystem 200, the DSP 208 performs the functions of the UMTS access service hardware, including the GGE block 242 and the WCDMA block 244. Although the DSP 208 is shown as part of the access hardware 202, a DSP need not necessarily be part of the UMTS access service hardware 212 or included as a part of the access hardware 202 at all.

The GGE block 242 is connected to an RF block 246, while the WCDMA block 244 is connected to an RF block 248. Each of the RF block 246 and the RF block 248 is connected to a bandselect & switch block 250 for the purpose of transmitting via respective power amplifier blocks 254 and 256. The bandselect & switch block 250 connects, for the purpose of receiving, the RF block 246 and the RF block 248 to an antenna 252 via the power amplifier blocks 254 and 256. The UMTS access service hardware 212 also has a universal asynchronous receiver transmitter (UART) interface 258 and a pulse code modulation (PCM) interface 260.

The datacom service hardware 214 includes a UART interface 262, a universal serial bus (USB) interface 240, an IrDA interface 238, a BLUETOOTH (BT) interface 236, and a UART interface 264. The basic service hardware 216 includes a power management interface 266 and a subscriber identity module (SIM) card interface 268. The IF service hardware 218 includes an access/application interface (AAIF) 270.

The access CPU software 206 includes UMTS access service software 220, datacom service software 222, basic service software 224, and IF service software 226. The access CPU software 206 also includes a hardware abstraction layer (HAL) 228. The HAL 228 isolates dependencies between software and hardware portions of the access subsystem 200. Also shown as a part of the access CPU software 206 is an access middleware (OPA) 230. The access middleware (OPA) 230 includes an OPA access module 232 and a proxy/stub 234. No execution environment control is typically needed on the access subsystem 200, since the application developers can control the access subsystem 200 but cannot place any applications on the access subsystem 200.

For a given service stack 106-112 shown in FIG. 1, a corresponding combination of service software, HAL, and hardware shown in the access subsystem 200 performs analogous functionality. For example, the UMTS access service stack 106 roughly corresponds to the combination of the UMTS access service hardware 212, the HAL 228, and the UMTS access service software 220, such that the UMTS access service software 220, the HAL 228, and the UMTS access service hardware 212 together perform UMTS access services.

Figure 3:
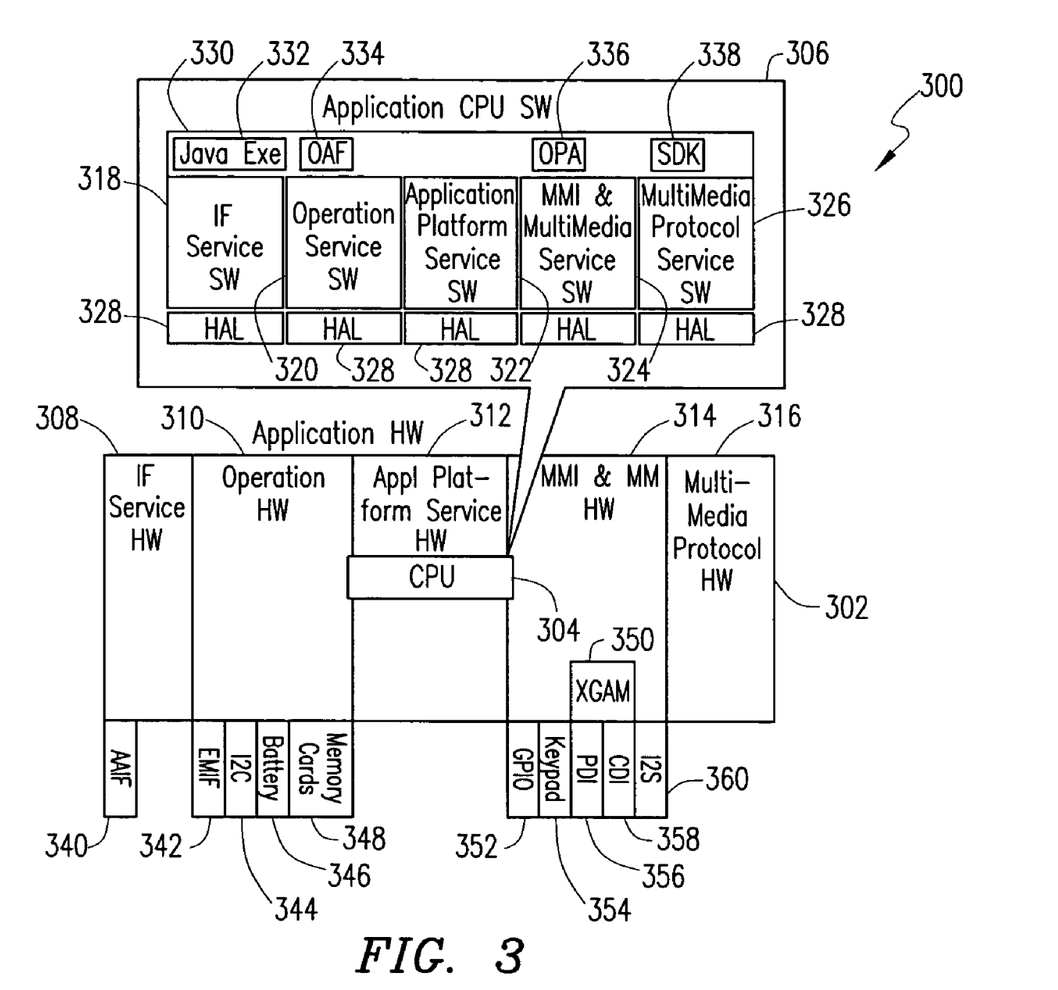
FIG. 3 is a functional block diagram of the application subsystem of the mobile-terminal platform system shown in FIG. 1.

When an external operating system (i.e., an operating system on an application subsystem other than the application subsystem 300 shown in FIG. 3) is used with the access subsystem 200, the external operating system will typically include all functionality present on the application subsystem 300, and may even duplicate some functionality located on the access subsystem 200, such as, for example, BLUETOOTH or TCP/IP functionality. The external operating system uses the functionality available on the access subsystem 200 via a communication interface. No changes to the access subsystem 200 should be needed when an external operating system is used, if the external operating system is able to communicate with the access subsystem 102 via the AAIF 270.

In order to simplify for type approval and real-time requirements of circuit-switched voice call audio, circuit-switched voice is typically handled on the access subsystem 200. Thus, audio processing is typically performed on the DSP 208 and delivered via digital audio interface towards an application subsystem, such as the application subsystem 300. The PCM interface 260 makes type approval and test & verification easier. It can, however, also be utilized for, for example, telematics solutions or external BLUETOOTH solutions.

UMTS access services are performed by a combination of the UMTS access service software 220, the HAL 228, and the UMTS access service hardware 212. The UMTS access services include support for various wireless communication standards, such as, for example, GSM, GPRS, EDGE, and WCDMA according to 3GPP. The UMTS access services may include functionality for circuit-switched voice, circuit-switched data, packet-switched data, short message service, supplementary services, and cell broadcast. The UMTS access services may be adapted to support, for example, GSM/GPRS/EDGE or GSM/GPRS/EDGE/WCDMA. The UMTS access services may also be adapted to provide full support for switching between WCDMA and GSM/GPRS/EDGE in idle and dedicated mode. HSDPA support may also be implemented.

The UMTS access services may also be adapted to support circuit-switched services to supply interfaces to manage call setup and handling. The call-setup-and-handling interfaces may include circuit-switched voice and data calls and provide functionality to manage calls by setting up, answering, and disconnecting regular voice calls, including emergency calls. The circuit-switched services may also have functionality to manage data calls in a similar way as voice calls. The UMTS access services may also be adapted to handle audio control of the access subsystem and basic functionality for positioning services. The positioning services may include, for example, support for assisted GPS and OTDOA.

In similar fashion to the UMTS access services, datacom services are performed by a combination of the datacom service software 222, the HAL 228, and the datacom service hardware 214. The datacom services typically include two types of services: 1) sockets services; and 2) COM-port services. A sockets interface allows applications to communicate with UDP or TCP connected services via an IP-based network using, for example, UMTS, BLUETOOTH, or USB. Both circuit-switched and packet-switched UMTS (e.g., GSM/GPRS/EDGE/WCDMA) bearers may be supported. DUN server (PPP server) functionality may be provided for IP traffic over a circuit-switched UMTS bearer. Examples of clients that use these services are WAP and multimedia applications.

The datacom services may also be adapted to permit dial-up networking from a laptop or PDA using any of a plurality of physical interfaces, such as, for example, the BT interface 236 or the IrDA interface 238. Both circuit-switched and packet-switched UMTS (e.g., GSM/GPRS/EDGE/WCDMA) bearers may also be supported. The datacom services may include PPP to support dial-up-networking service towards a packet-switched bearer from, for example, a laptop, PDA, or PC. RS232 services may be used to support dial-up networking from a laptop, PDA, or PC using asynchronous serial communication.

BLUETOOTH services may be used to support dial-up networking from a laptop, PDA, or PC using a BLUETOOTH radio bearer. In addition, audio and telephony control services for a BLUETOOTH headset may be supported. The BLUETOOTH services may include host functionality for, for example, WAP over BLUETOOTH. An IrDA service may be used to support dial-up networking from, for example, a laptop, PDA, or PC using infrared communication according to IrDA. IrDA may also be used for object exchange. USB service may be used to support a slave role in order to allow dial-up networking from, for example, a USB-enabled laptop, PDA, or PC according to the sub-class specification for Wireless Mobile Communication Devices. USB On-The-Go (USB OTG) may also be supported. An AT command service may be used to allow dial-up networking from, for example, a laptop, PDA, or PC via an external interface.

The datacom services may be enhanced with a network access point or packet-based UMTS network according to zero-configuration access to packet networks (ZAP). For access to packet-switched services, an SNMP server and a special-purpose MIB (for terminals supporting packet-switched services) may be provided as an alternative to AT commands and DUN server functionality.

The datacom service software 222 may include the following software modules (not explicitly shown): BLUETOOTH and BLUETOOTH driver; IrDA and IrDA driver; USB and USB driver; RS232, ACB and UART drivers; IP; SNMP; AT; and modem Services. Modem functionality is typically implemented via a connection between an external interface and UMTS. The modem functionality is completely handled by the access subsystem.

Basic services are provided by a combination of the basic service software 224, the HAL 228, and the basic service hardware 216. The basic services may include the following functionalities: SIM access; access security; system control; and distributed-component-model support. SIM/USIM application toolkit (SAT/USAT) services may be used to offer related functionality to an application developer. The SAT/USAT services operate as a link between a SIM card and a user equipment (UE) that incorporates the access subsystem 200. One use of the SAT/USAT services is to inform the SIM card about the outcome of proactive commands sent to the UE (i.e., whether the UE should return responses such as DisplayText or Select/Item to the SIM card to notify the card about the result of the command).

The basic services represent general access services, such as, for example: system control; SIM; core access security; access cryptographic; access terminal management; component management; and proxy management. The system control handles power-up and power-down of the access subsystem. The system control also controls different operating modes that the access subsystem 200 can work in, such as, for example, radio-off. The SIM card interface 268 handles SIM, USIM, SIM AT, USIM AT, and WIM on SIM. The SIM card interface 268 is intimately connected to system security modules, as the security modules are the interface for applications towards security tokens on a SIM card.

Access cryptographic includes low-level security functionality needed by applications such as, for example, browsers and execution environments. Security hardware support may be included on the access subsystem 200. When the security hardware support is on the access subsystem 200, necessary cryptographic hardware is present on the access subsystem 200 irrespective of what type of application platform is used. A cryptographic interface towards cryptographic hardware may also be provided. Access terminal management handles secure remote control of terminal access-related security settings, credentials, and configuration.

The component management and the proxy management are related to the DCM technology used for the access middleware (OPA) 230. A component manager keeps a table of all installed components. When a remote component is requested, the component manager notifies the proxy manager, who sets up the needed proxy-stub pairs for the remote access. The proxy/stub 234 takes care of the marshalling and de-marshalling of the communication.

IF services are performed by a combination of the IF service software 226, the HAL 228, and the IF service hardware 218. The IF services handle functionality required to interface between the access subsystem 200 and an application subsystem, such as the application subsystem 300. The IF services carry all traffic, data, and control, between the access subsystem 200 and an application subsystem, including digital audio between the access subsystem 200 and the application subsystem. Different quality-of-service (QoS) modes may be provided as a feature of the IF services.

FIG. 3 is a functional block diagram of an application subsystem 300. In accordance with the functional split described above relative to FIG. 1, the application subsystem 300 typically handles user applications, such as, for example, a user file system, messaging services, multimedia services, streaming services, audio other than circuit-switched audio, WAP stack, OBEX, basic UI service, middleware services, and application security. In contrast to the access subsystem 200, the application subsystem 300 does not require a clock as accurate as the access subsystem 200, since the application does not have to meet the air-interface requirements that must be met by the access subsystem 200, except as regards circuit-switched audio.

The application subsystem 300 includes application hardware 302. The application hardware 302 includes an application CPU 304. Application CPU software 306 is loaded on the application CPU 304. The application hardware 302 includes IF service hardware 308, operation service hardware 310, application platform service hardware 312, man-machine interface (MMI) and multimedia (MM) service hardware 314, and multimedia protocol (MMP) hardware 316. The hardware 308-316 logically represent functions performed by the application CPU 304 with the application CPU software 306 loaded thereon.

The application CPU software 306 includes IF service software 318, operation service software 320, application platform service software 322, MMI and MM service software 324, and MMP service software 326. Also included within the application CPU software 306 is a HAL 328 corresponding to each of the service softwares 318-326. The application CPU software 306 also includes an application middleware (OPA) 330. The application middleware (OPA) 330 includes a Java EXE block 332, an Open Application Framework (OAF) block 334, an OPA block 336, and an SDK toolset 338. Within the application middleware (OPA) 330, the OPA 336 serves as an interface accessible by the application developer. Although the OPA 336 is shown in FIG. 3 as part of the application middleware (OPA) 330, implementation of the OPA 336 may physically reside on the access subsystem 200.

The application subsystem 300 typically handles all application services that can be configured to a specific product; therefore, the application subsystem 300 scales with the type of services needed and the performance of the services supported. The functionality of the application subsystem 300 may be exported to an application developer through the application middleware (OPA) 330.

The IF service hardware 308 includes an AAIF 340. The AAIF 340 interfaces with, for example, the AAIF 270 of the access subsystem 200. The operation service hardware 310 includes an external memory interface (EMIF) 342, an inter-integrated-circuit-bus interface 344, a battery interface 346, and a memory card interface 348.

The MMI and MM service hardware 314 includes a graphic acceleration module (XGAM) hardware block 350. The MMI and MM service hardware 314 includes a general purpose input-output (GPIO) interface 352, a keypad interface 354, a personal data interchange (PDI) interface 356, a camera data interface (CDI) 358, and an I2S interface 360.

The access subsystem 200 may be used in conjunction with an application subsystem such as the application subsystem 300 or other application subsystems running various operating systems, such as, for example, OSE, SYMBIAN, or WINDOWS CE. While the hardware and software of the access subsystem 200 remain basically unchanged, the chosen operating system may run on various hardware, including, but not limited to, the application subsystem 300. Depending on the interface method and hardware used, the operating system may need to be equipped with custom drivers or access-application communication devices to utilize the functionality of the access subsystem 200. How this is done will depend on the chosen operating system and on how much of the functionality of the access subsystem 200 is to be used by the chosen operating system and hardware.

When the access subsystem 200 and the application subsystem 300 are used together, the application middleware (OPA) 330 is typically the only interface that is exported to application developers. Thus, the application developers do not need to know the details of communications between the access subsystem 200 and the application subsystem 300. From the application developers' point of view, the application subsystem 300 and the access subsystem 200 typically are designed to act together as a single entity so that the functional split therebetween is not visible to the application developer.

OPA implementation within the access middleware (OPA) 230 of the access subsystem 200 and the application middleware (OPA) 330 of the application subsystem 300 may be according to at least two options. In the first option, the entire OPA (e.g., the entire combined functionality of the access middleware (OPA) 230 and the application middleware (OPA) 330) resides on the application subsystem 300 and communications from the entire OPA with a platform comprising the access subsystem 200 and the application subsystem 300 is made via internal communications. In a second option, parts of the entire OPA that are access-related are implemented on the access subsystem 200. In the second option, any split of the entire OPA into two parts is not visible to the application developer and any proxy needs to implement function calls between the application subsystem 300 and the access subsystem 200. When the second option is utilized, the access subsystem 200 may be used in a stand-alone mode for, for example, telematics solutions, or together with an external application subsystem as discussed above. Communications between the portions of the entire OPA implemented on the application subsystem 300 (or an external subsystem) and the access subsystem 200 occur via the AAIF 270 and the AAIF 340.

Data communication functions are divided between the access subsystem 200 and the application subsystem 300. From an OSI reference model point of view, the physical, data link, network and transport layers are located on the access subsystem 200, while the session, presentation and application layers are located on the application subsystem 300.

For a given service stack 114-122 shown in FIG. 1, a corresponding combination of service software, HAL, and hardware shown in FIG. 3 performs analogous functionality. For example, the operation service stack 116 roughly corresponds to the combined operation service software 320, HAL 328, and operation service hardware 310. Thus, operation services are performed by the combination of the operation service software 320, the HAL 328, and the operation service hardware 310.

The operation service software 320 typically includes software modules for system control, system data handling, component management, proxy management, XML tool kit, core application security, application cryptographic functions, smart card functions, and application terminal management. System control refers to coordination of activation, execution, and deactivation of core functionality of the application subsystem 300. Persistent data handling (PDH) is used by applications to store data related to operation thereof in a structured tabular manner. PDH allows applications to search data or sort data. The XML tool kit is typically a generic module intended for both platform internal and external use, aiding applications with handling of XML documents. When using the XML tool kit, applications need only a rudimentary knowledge about XML and its syntax. The core application security module contains software reprogramming protection mechanisms, including factory flashing and secure software upgrading.

The application cryptographic module provides cryptographic services to applications such as, for example, a browser email client or a java run time environment. The cryptographic services may include, for example, cryptographic computation, secure storage and certificate handling. The application terminal management software module handles secure remote control of terminal application-related security settings, credentials, and configuration.

The operation service hardware 310 may include, for example, a mixed-signal ASIC that manages startup timing. Following a power reset, software typically takes control of the platform and voltages can be changed in power-saving modes programmed and activated using a hardware signal. Fully-automated voltage, temperature, current, and event watches can also be implemented to minimize loading of the CPU 304.

Application services are performed by a combination of the application platforms service software 322, the HAL 328, and the application platform service hardware 312. The application platform services may include, for example, SMS/EMS services, cell broadcast service, phone book service, platform accessory services, clock service, and positioning application service. An MMS client is not necessarily part of the platform system itself, as the MMS client is typically realized on an application level. Functionality for the MMS client is typically exported via the OPA 330.

A messaging transport service may be used to permit an application developer to access processes that save, delete, create, and send an individual SMS or EMS. The cell broadcast service provides functionality for handling all messages received on a cell broadcast channel, which is a point-to-multi-point broadcast service. Phonebook services permit storage, retrieval, modification, deletion, and searching of records on a SIM/USIM card or in a phonebook database. The clock service handles client application requests for time information derived from a UE real time clock (RTC). The positioning application service provides processes for handling positioning requests and verification procedures.

MMI and MM services are performed by a combination of the MMI and multimedia service software 324, the HAL 328, and the MMI and MM service hardware 314. The man-machine interface (MMI) and multimedia (MM) services support user interface operation. Services provided by the MMI and MM services may include: user interface (UI) services; audio services and control (including system sounds and music player); voice control services; graphics (display) services; image services; camera services; and video services.

The user interface functionality typically includes a UI server, which provides fundamental UI functionality, and a UI toolkit, which handles additional UI functionality. The UI server handles control of access to display and LEDs, supplies a window system that performs the task of routing input events such as keystrokes and touchscreen activities to the proper application, and schedules output of graphics and user notifications, except for sounds.

User input events, such as key presses from a keyboard/touch screen and pen events from a touch screen, may be routed from hardware drivers, mapped into logical events in the UI Server, and directed to the proper application via the OPA 330. The applications can make use of input methods to translate raw input data into more useful formats. A general mechanism for invoking input methods is implemented in the platform system; application developers may add the actual input methods separately as extensions to the OPA.

The image services provide functionality to handle images in a variety of formats. Images can be decoded, encoded, or edited, and can be stored in internal memory or on a removable memory card. Images can be downloaded via the network or acquired via, for example, a built-in camera or camera accessory. Padding of images that are larger than the display itself may be supported, as may be functions such as zooming, dithering, cropping, and rotation.

The camera services offer functions for use of a camera server. The camera server is responsible for any internal camera. The camera services interface provides processes for: taking and storing a picture; starting and stopping the camera; retrieving and setting camera capabilities; using a viewfinder mode; and recording video.

Audio and video services offer functions to play and record audio and video to and from supported (stored) media files. A user can set volume, adjust audio band equalization, and choose the type of audio or BLUETOOTH accessory to use before playing content. The content can be stored in internal memory or on an external memory card. Audio and video codecs can also be used for streaming and conversational audio/video functionality. Voice control services offer functionality for isolated word recognition, AMR-encoded voice tags, magic word, and voice-activated dialing or answering.

Scalability in the MMI and MM services is provided in terms of functional configuration and performance configuration. It is possible to add and remove multimedia functionality, such as, for example, functionality for audio codecs, video codecs, still-image codecs, three-dimensional (3D) graphics, and audio equalizer. Multimedia functionality influences RAM and flash consumption. It is also possible to remove hardware accelerator blocks, such as, for example, those for 3D graphics. The functionality is not necessarily completely removed; rather, performance may instead be reduced. Accelerator-block performance may also be configured by RAM speed and size. The MMI & MM services include all multimedia support excluding circuit switched voice call functionality, which is typically provided by the access subsystem 200.

Multimedia protocol (MMP) services are provided by a combination of the MMP service software 326, the HAL 328, and the MMP hardware 316. MMP services provide application protocol services, including, for example, multimedia protocols, WAP protocols, OBEX protocol, and BLUE-TOOTH application services. The MMP services provide protocols for both packet-switched and circuit-switched bearers. The multimedia protocols that may be supported are, for example, RTP, RTSP, SIP, and H.324M. The MMP services may also be adapted to support conversational multimedia services according to the 3GPP IP Multimedia Core Network Subsystem (IMS). The conversational multimedia services may include, for example, both real-time video and voice sessions (e.g., VoIP) and non-real-time presence and instant-messaging services. The control protocol for these services is typically SIP.

For video conferencing services, the H.223 and H.245 protocols may be supported. Other application capabilities can also be added, including, for example, data synchronization or MMS. OBEX protocol provides services for data exchange to/from an external device and may be initiated either by an application using the OPA or by a client in an external device. The BLUETOOTH application services include processes for identification of available BLUE-TOOTH-capable devices.

The application subsystem 300 owns the analog audio interface. Thus, the access subsystem 200 must deliver a digital audio stream via an interface connected to the application subsystem 300. This interface is typically a PCM data channel over the access-application interface. During a circuit-switched voice call, the application subsystem must route PCM data to a mixed-signal circuit (not shown in FIG. 3). This routing can be made in both hardware and software. However, the application can process the digital audio prior to delivery.

In terms of circuit-switched audio, the responsibility of the application subsystem 300 is to provide an audio path from the access-application interface to the interface of the mixed-signal circuit (not shown in FIG. 3). The application subsystem 300 can introduce more audio processing, such as mixing in other sound sources and recording of an ongoing voice call. For non-circuit-switched voice-call audio, the application subsystem 300 provides audio codecs and only requests a data path between the access subsystem 200 and the application subsystem 300.

Figure 4:
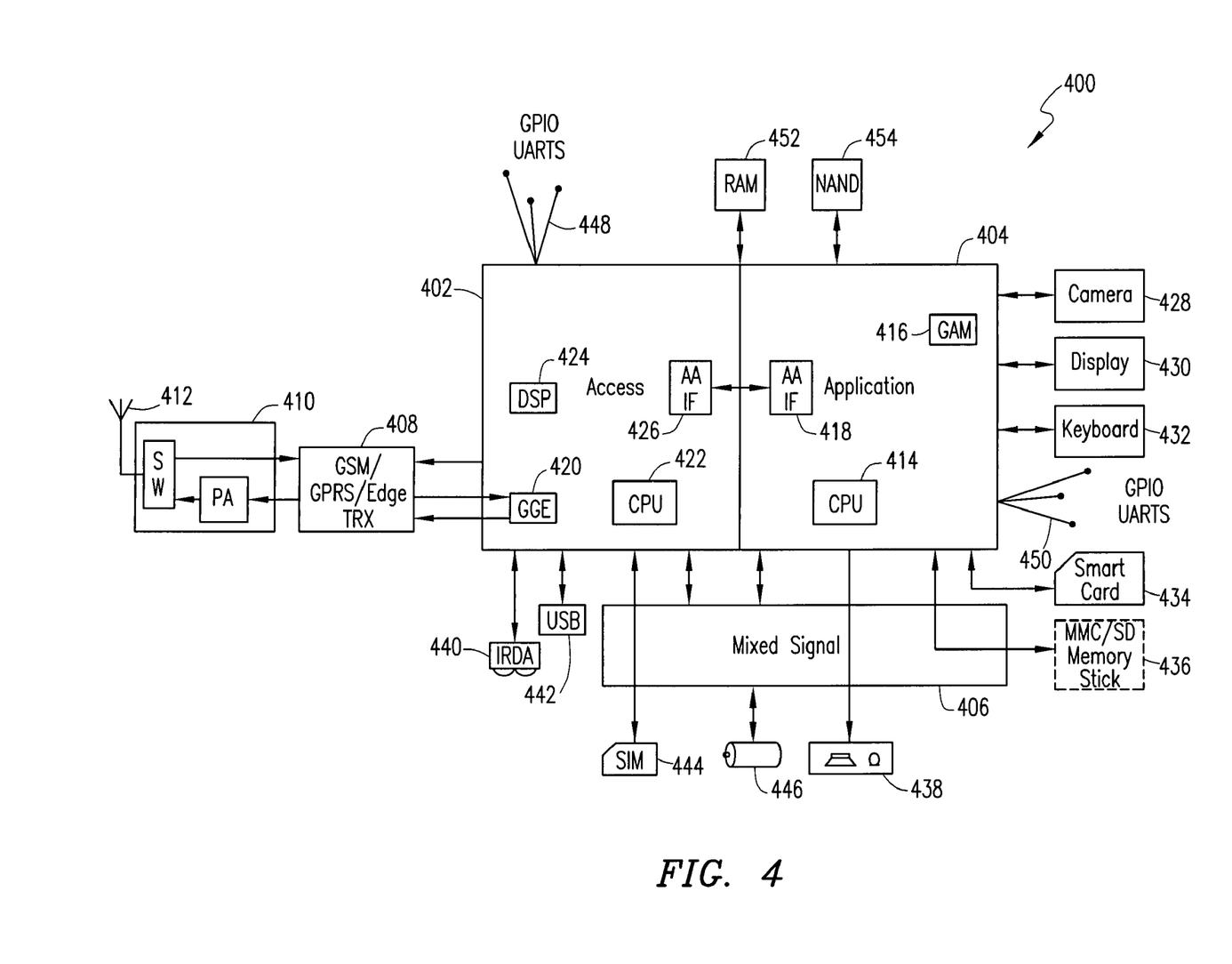
FIG. 4 illustrates a low-cost mobile-terminal implementation adapted to operate in accordance with GSM/GPRS/EDGE.
Figure 5:
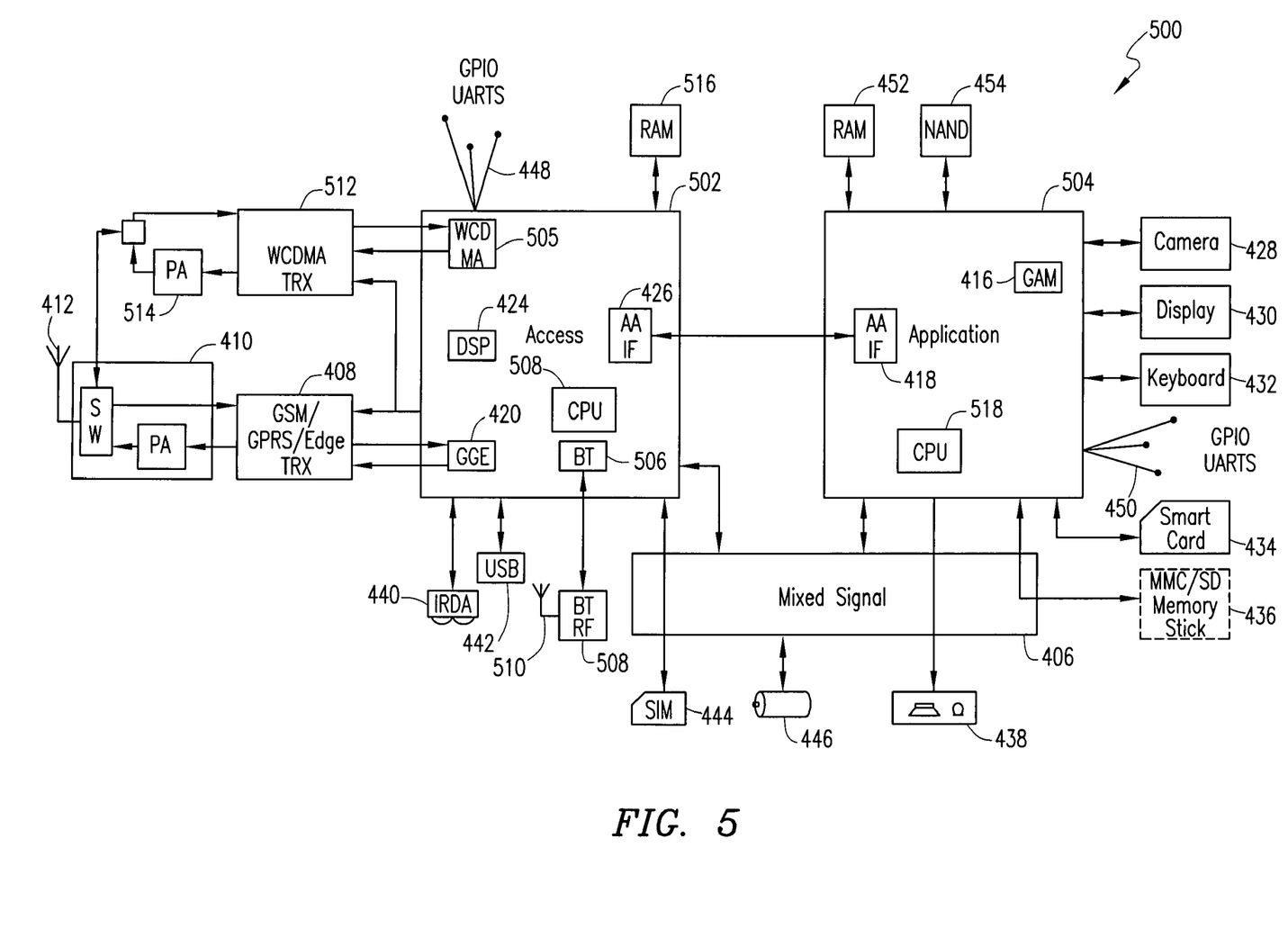
FIG. 5 illustrates a low-cost mobile-terminal implementation adapted to operate in accordance with GSM/GPRS/EDGE/WCDMA.
Figure 6:
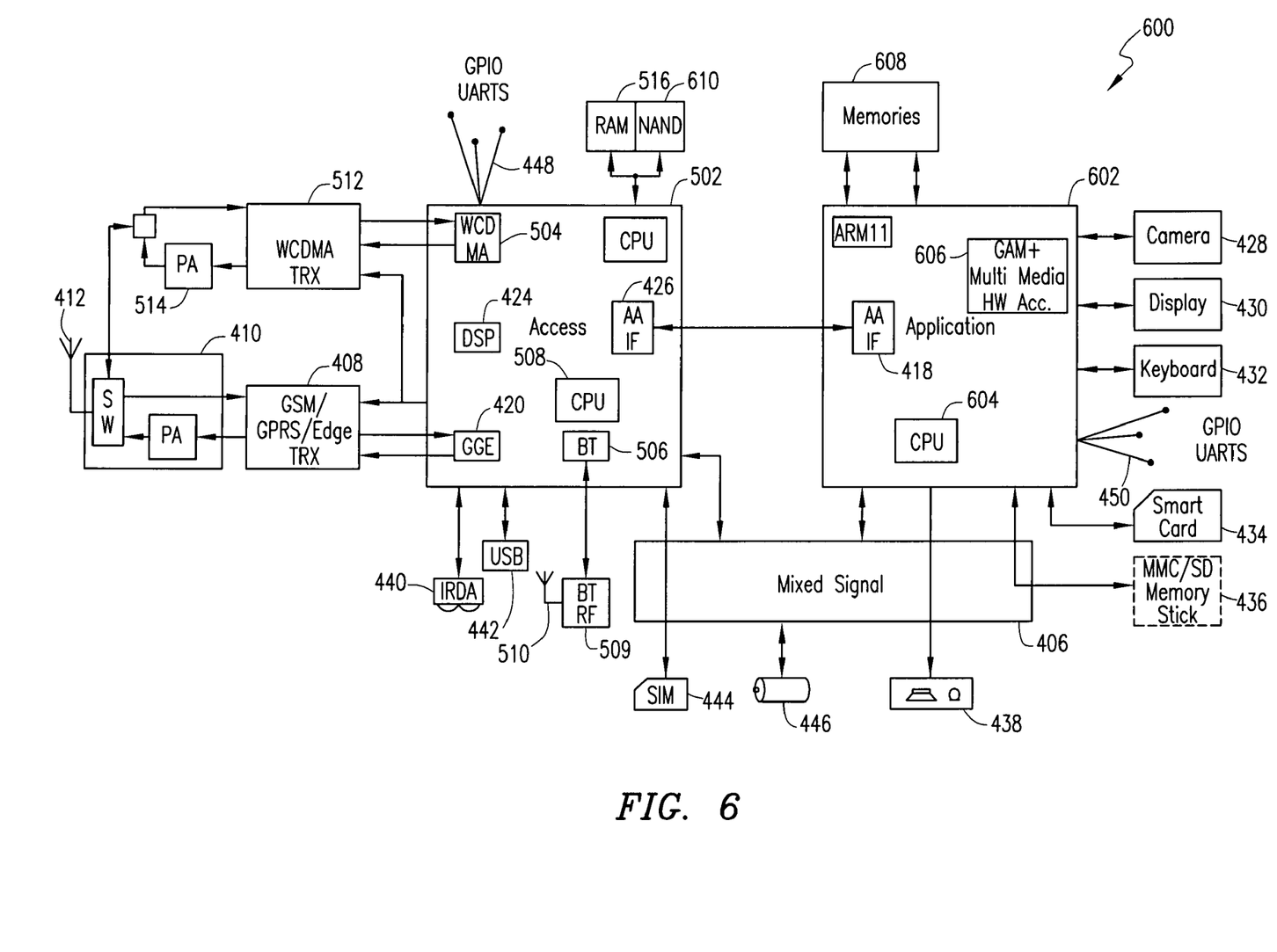
FIG. 6 illustrates a high-functionality mobile-terminal implementation adapted to operate according to GSM/GPRS/EDGE/WCDMA.

FIGS. 4-6 illustrate exemplary mobile-terminal implementations that utilize a scalable platform system. FIG. 4 illustrates a low-cost mobile-terminal implementation adapted to operate in accordance with GSM/GPRS/EDGE. FIG. 5 illustrates a low-cost mobile-terminal implementation adapted to operate in accordance with GSM/GPRS/EDGE/WCDMA. FIG. 6 illustrates a high-functionality mobile-terminal implementation adapted to operate according to GSM/GPRS/EDGE/WCDMA.

Each of the exemplary implementations shown in FIGS. 4-6 may be adapted to integrate EDGE functionality together with GSM/GPRS such that signal processing is performed on a single DSP located on the access subsystem. Integrating the EDGE functionality with GSM/GPRS functionality may allow prior platform work to be leveraged and also permits more flexibility in signal processing algorithms for GSM/GPRS. In addition, reuse of common elements by GSM/GPRS and EDGE may serve to reduce total costs. The DSP may be used for basic circuit-switched voice processing, such as, for example, noise suppression, adaptive multi-rate (AMR) speech encoding and decoding, echo cancellation, and acoustic compensation.

Further, in the implementations shown in FIGS. 4-6, development, verification, and type approval may be simplified by separating access services, which are performed by the access subsystem, from generic applications. The application subsystems shown in FIGS. 4-6 are typically built around a cache-based microcontroller. Although no application-subsystem DSP is shown in the implementation illustrated in FIGS. 4-6, an application-subsystem DSP may be included in the application subsystem if needed. Moreover, even though each of the implementations shown in FIGS. 4-6 includes a DSP for signal processing, implementations of a scalable platform system without a DSP are possible, and may indeed be desirable under certain circumstances.

As will be further illustrated below relative to FIGS. 4-6, a wide scope of implementations may be supported by the platform system. In designing the implementations, consideration is given to various possible implementations that may be generated from the platform system and allowance made for the possibility of unique characteristics of a circuit included in each of the implementations as well as scalability of any common elements included in the implementations. Although each of the implementations shown in FIGS. 4-6 is typically implemented using one or more ASICs, implementations using other components may be developed and utilized as deemed appropriate by a designer. As will be apparent to those having skill in the art, the platform system is scalable, such that low-performance to high-performance implementations may be readily developed with a minimal number of integrated circuits and to reuse already-developed software from a previously-developed implementation.

FIG. 4 is a block diagram of a low-cost mobile terminal that could, for example, target entry segments among users that are not interested in WCDMA services or to whom WCDMA is not available. In FIG. 4, a mobile terminal 400 includes an access subsystem 402, an application subsystem 404, a mixed-signal circuit 406, a GSM/GPRS/EDGE transmit block 408, a power amplifier block 410, and an antenna 412. The application subsystem 404 includes a CPU 414, which may be, for example, a RISC processor such as, for example, the ARM9 processor. The application subsystem 404 also includes a graphics acceleration module (GAM) 416 and an AAIF 418.

The access subsystem 402 includes GSM/GPRS/EDGE hardware 420, a CPU 422, a DSP 424, and an AAIF 426. As noted above, communication between the application subsystem 404 and the access subsystem 402 occurs via the AAIF 418 and the AAIF 426. The CPU 422 may be a RISC processor such as, for example, the ARM7 processor. In the embodiment shown in FIG. 4, the access subsystem 402 and the application subsystem 404 are implemented on the same chip.

Various external interfaces are part of the application subsystem 404 and the access subsystem 402. For example, a camera interface 428, a display interface 430, a keyboard interface 432, a smart card interface 434, a multimedia card/secure digital (MMC-SD) memory interface 436, and a speaker/microphone interface 438 are included as part of the application subsystem 404. An infrared data association (IrDA) interface 440, a universal serial bus (USB) interface 442, and a subscriber identify module (SIM) interface 444 are shown and included in the access subsystem 402. A battery 446 is shown connected to the mixed-signal circuit 406. Each of the access subsystem 402 and the application subsystem 404 may have a plurality of general purpose input/outputs (GPIOs) and/or universal asynchronous receiver/transmitters (UARTs), as indicated by reference numerals 448 and 450.

A shared random access memory (RAM) 452 is shown serving both the access subsystem 402 and the application subsystem 404. A NAND flash memory 454 is shown connected to the application subsystem 404. Although the flash memory 454 is illustrated as a NAND flash memory, any suitable type of flash memory may be used. For example, NOR flash memory may be used in place of part of the shared RAM 452, since NOR flash memory is capable of eXecution In Place (XIP), whereas NAND flash memory is not capable of XIP.

In the mobile terminal 400, both the access subsystem 402 and the application subsystem 404 baseband functionality are integrated onto a common chip. The mobile terminal 400 represents a cost-centric solution with minimal functionality and without WCDMA support. Therefore, no WCDMA block or associated radio-frequency (RF) support are present. In addition, because the mobile terminal 400 represents a cost-centric solution, the CPU 14 and the GAM 416 are typically less-expensive lower-performance modules than what would be used in more high-performance mobile terminals.

A memory system comprising the RAM 452 and the NAND flash memory 454 is chosen to have low cost without compromising performance relative to current, bandwidth, and other considerations. In order to reduce the overall number of chips, the application subsystem 404 and the access subsystem 402 are shown sharing the RAM 452. In a typical implementation of the mobile terminal 400, software for the access subsystem 402 and the application subsystem 404 is downloaded from the NAND flash memory 454 to the RAM 452.

As noted above, the access subsystem 402 and the application subsystem 404 communicate with one another via the AAIF 418 and the AAIF 426. The mixed-signal circuit 406 provides power supplies needed by the mobile terminal 400 as well as power management, audio amplifier, and level shifting for some external interfaces. The mixed-signal circuit 406 also includes audio functionality for transforming digital audio to analog audio and vice versa. The mixed-signal circuit 406 shown in FIG. 4 will also be used in the mobile terminals shown in FIGS. 5 and 6; however, low dropout regulators (LDOs) not present in the mobile terminal 400 will typically be supported in higher-end mobile terminals.

FIG. 5 illustrates a low-cost mobile terminal 500 with WCDMA capability. In contrast to the mobile terminal 400, in the mobile terminal 500, an access subsystem 502 and an application subsystem 504 are physically separated into two separate chips. In contrast to the access subsystem 402, the access subsystem 502 includes a WCDMA block 505, a BLUETOOTH (BT) block 506, and a CPU 508. The CPU 508 may be a RISC processor that is identical to or includes a different functionality than the CPU 422. The BT block 506 is connected to a BT RF block 509 and a BT antenna 510.

The WCDMA block 505 is connected to a WCDMA transmit block 512. The WCDMA transmit block is connected to a power amplifier block 514. In addition, the access subsystem 502 is served by a dedicated RAM 516. The access subsystem 502, the WCDMA transmit block 512, the GSM/GPRS/EDGE transmit block 408, the power amplifier block 410, and the power amplifier block 514 are typically implemented on the same chip. The application subsystem 504 includes a CPU 518. The CPU 518 may be a RISC processor identical to the CPU 414 or one having different capabilities than the CPU 414. For example, the CPU 518 may be an ARM9 processor.

FIG. 6 illustrates a high-end mobile terminal 600. The mobile terminal 600 provides the same access capabilities as the mobile terminal 500 (i.e., WCDMA/GSM/GPRS/EDGE). Thus, the access subsystem 502 is used in the mobile terminal 600, which allows a reuse of the hardware and software of the access subsystem 502 in the mobile terminal 600.

A performance upgrade to the mobile terminal 600 relative to the mobile terminal 500 is focused upon an application subsystem 602 of the mobile terminal 600. The application subsystem 602 includes a CPU 604. The CPU 604 is more powerful than the CPU 518 and may be, for example, an ARM11 processor. The application subsystem 602 also includes the AAIF 418, which is identical to the AAIF 418 in the application subsystem 504 and in the application subsystem 404. However, the application subsystem 602 includes more graphic and multimedia support than the application subsystem 504 as indicated by a GAM+MULTIMEDIA HW ACCELATOR (GMMA) module 606. The inclusion of the CPU 604 and the GMMA module 606 allow the mobile terminal 600 to be targeted towards high-end applications such as, for example, smart phones or personal digital assistants (PDAs).

A memories block 608 is shown connected to the application subsystem 602. The memories block 608 is shown as a blank box because the type, amount, and configuration of the memories block 608 is dependent upon the applications to be run on the mobile terminal 600 and therefore could vary greatly.

A NAND flash memory 610 is shown connected to the access subsystem 502. The NAND flash memory 610 is shown as sharing a bus with the RAM 516. In the configuration shown in FIG. 6, it might not always be possible to download from the application subsystem 602, particularly if the access subsystem 502 needs its own non-volatile memory. Thus, the NAND flash memory 610 may be used to download data to the access subsystem 502. The NAND flash memory 610, although shown as being in a NAND configuration, may also be, for example, NOR flash one or two bit cell technology or a NAND flash memory realized as NAND with a NOR flash interface (e.g., MMDOC), since the interface between the NAND flash memory and the RAM 516 and the access subsystem 502 is the only supported interface to the access subsystem 502. However, it is also possible that the NAND flash memory 610 could be moved to access the application subsystem 602 in similar fashion to that shown with respect to the mobile terminal 500.

In various embodiments of the invention, watch-dog-timers are provided in both the access subsystem 102 and the application subsystem 104, as well as in a mixed-signal part, in an effort to ensure that any single subsystem failure may be readily handled. The previous Description is of embodiment(s) of the invention. The scope of the invention should not necessarily be limited by this Description. The scope of the present invention is instead defined by the following claims and the equivalents thereof.

What is claimed is:

1. A mobile-terminal platform system comprising:
   an application subsystem comprising hardware and software for providing user application services, further comprising
   an interface service stack wherein the interface service stack is configured to permit the application subsystem to communicate with the access subsystem;
   an operation service stack, wherein the operation service stack is configured to provide system control, system data handling, component management, and proxy management;
   an application-platform service stack, wherein the application-platform service is adapted to provide at least one of Short Message Service (SMS) cell broadcast service, phone book service, platform accessory services, clock service, and positioning application service;
   a man-machine interface and multimedia stack, wherein the man-machine interface and multimedia stack is configured to provide at least one of user interface services, audio services and control, voice control services, graphics services, image services, camera services, and video services; and
   a multimedia protocol stack, wherein the multimedia protocol stack is configured to provide application protocol services;
   an access subsystem comprising hardware and software for providing connectivity services;
   wherein the application subsystem and the access subsystem communicate via a defined interface; and
   wherein each of the application subsystem and the access subsystem are independently scaled and wherein the application subsystem and the access subsystem operate on different clocks.

2. The mobile-terminal platform system of claim 1, wherein the application subsystem comprises a middleware adapted to allow application developers to access the application subsystem and the access subsystem.

3. The mobile-terminal platform system of claim 1, wherein scaling of the application subsystem does not decrease functionality of the access subsystem.

4. The mobile-terminal platform system of claim 1, wherein scaling of the access subsystem does not decrease functionality of the application subsystem.

5. The mobile-terminal platform system of claim 1, wherein access to the mobile-terminal platform system may only be made via the middleware.

6. The mobile-terminal platform system of claim 1, wherein an access subsystem clock is more accurate than an application subsystem clock.

7. The mobile-terminal platform system of claim 1, wherein:
   the communication-standard service stack is configured to operate according to at least one wireless-communication standard;
   the data-communications service stack is configured to provide at least one of sockets services and communication-port services;
   the basic service stack is configured to provide general access services; and
   the interface service stack is configured to permit the access subsystem to communicate with the application subsystem.

8. The mobile-terminal platform system of claim 1, wherein the at least one wireless-communication standard comprises at least one of Global System for Mobile Communications (GSM), General Packet Radio System (GPRS), Enhanced Data Rates for GSM Evolution (EDGE) and Wideband Code Division Multiplexing Access (WCDMA).

9. The mobile-terminal platform system of claim 1, wherein the application protocol services comprise multimedia protocol services, wireless application protocol (WAP) services, object exchange OBEX protocol services, and BLUETOOTH application services.

10. The mobile-terminal platform system of claim 1, wherein the access subsystem is configured to be used in a stand-alone mode.

* * * * *

UNITED STATES PATENT AND TRADEMARK OFFICE
CERTIFICATE OF CORRECTION

PATENT NO. : 7,707,592 B2  Page 1 of 1
APPLICATION NO. : 10/857522
DATED : April 27, 2010
INVENTOR(S) : Wesslen et al.

It is certified that error appears in the above-identified patent and that said Letters Patent is hereby corrected as shown below:

In Column 17, Line 27, in Claim 1, delete "(SMS)" and insert -- (SMS), --, therefor.

Signed and Sealed this

Twenty-seventh Day of July, 2010

David J. Kappos
*Director of the United States Patent and Trademark Office*